May 26, 1959 H. E. ENGELSON ET AL 2,888,125
SYNCHRONIZED CONVEYER LOADING ARRANGEMENT
Filed Oct. 25, 1956 4 Sheets-Sheet 1

INVENTORS:
HARRY E. ENGLESON
ELMER D. SRAMEK
BY
ATT'YS

INVENTORS:
HARRY E. ENGLESON
ELMER D. SRAMEK
BY
Mazgall, Johnston, Cook & Root.
ATT'YS

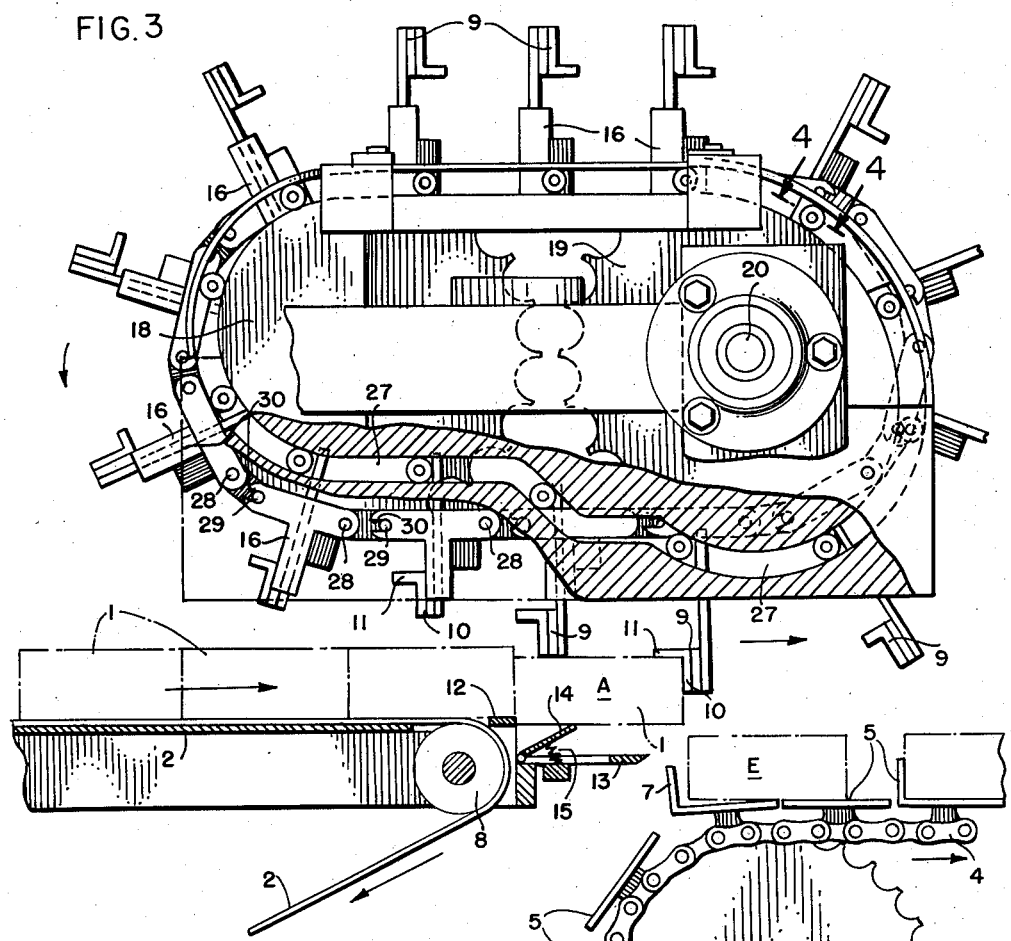
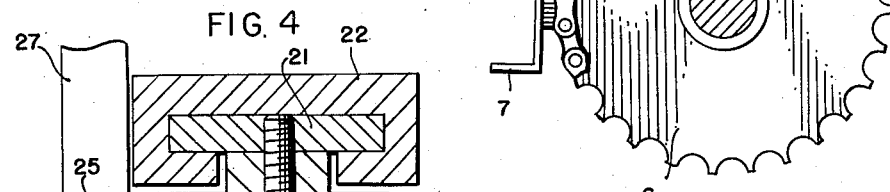

May 26, 1959 H. E. ENGELSON ET AL 2,888,125
SYNCHRONIZED CONVEYER LOADING ARRANGEMENT
Filed Oct. 25, 1956 4 Sheets-Sheet 4

INVENTORS
HARRY E. ENGLESON
ELMER D. SRAMEK
BY
*Margall, Johnston, Cook + Root*
ATT'YS

United States Patent Office 2,888,125
Patented May 26, 1959

2,888,125

SYNCHRONIZED CONVEYER LOADING ARRANGEMENT

Harry E. Engelson, Chicago, and Elmer D. Sramek, Cicero, Ill., assignors to F. B. Redington Co., Village of Bellwood, Ill., a corporation of Delaware Application October 25, 1956, Serial No. 618,244

9 Claims. (Cl. 198—20)

This invention relates to a packaging machine, wherein articles to be packaged are transported by a conveyer having especially adapted holders or pockets for carrying the articles.

This invention consists generally of a new and improved conveyer bucket loading arrangement wherein articles are received at random timing from a belt conveyer and are transferred or loaded into a bucket conveyer wherein it is essential that the articles pass into the respective buckets at proper intervals of time.

It is an object of this invention to provide an improved conveyer arrangement wherein a bucket conveyer receives articles from a belt conveyer and continues to transport the articles generally in the same direction and continuing along the same line as the belt conveyer; and to provide an improved method and means for loading the buckets by intercepting and delaying the articles moving from the belt conveyer until a proper timed interval, whereupon the articles may be dropped into a moving bucket.

A further object is to provide an improved synchronizing arrangement for moving articles wherein a plurality of timing bars move in spaced relation over a belt conveyer and wherein each bar may descend vertically to impinge upon and depress a first article moving from the belt conveyer until the first article drops into a bucket of the second conveyer, whereupon the bar provides an abutting surface for restraining the travel of the next succeeding or second article, and finally the bar may descend to a lower level depressing the foremost end of the second article into the next succeeding conveyer bucket.

A further object is to provide an improved means for mounting timing bars on a movable chain which is trained around a pair of sprockets; a slideway extending radially from the chain is provided with a T-bracket having one end pivotally mounted on the chain and having the other end slotted to receive a pin extending from the chain, whereupon the T-bracket is firmly supported at both ends thereof and the spaced distance between the pivotal mounting and the extending pin both coupled to the chain may vary somewhat as the bracket moves along a straight span of the chain and thence moves about an end sprocket assuming the position of a chord of the circle about the sprocket which the chain must follow.

A more complete understanding of the present invention, its mode of operation, and its advantages, may be gathered from further reading of this specification, together with an inspection of the accompanying drawings in which:

Fig. 3 is a vertical elevational view of the apparatus shown in Fig. 1 and wherein certain parts have been broken away to show the underlying structure;

Fig. 4 is an enlarged fragmentary section along the line 4—4 of Fig. 3;

Fig. 5 is a section along the line 5—5 of Fig. 4; and

Figs. 3, 6 and 7 illustrate the timed sequence and operation of the timing bars of this invention as they function to receive articles from the belt conveyer and to drop the articles synchronously into the buckets of the bucket conveyer.

Figure 2:
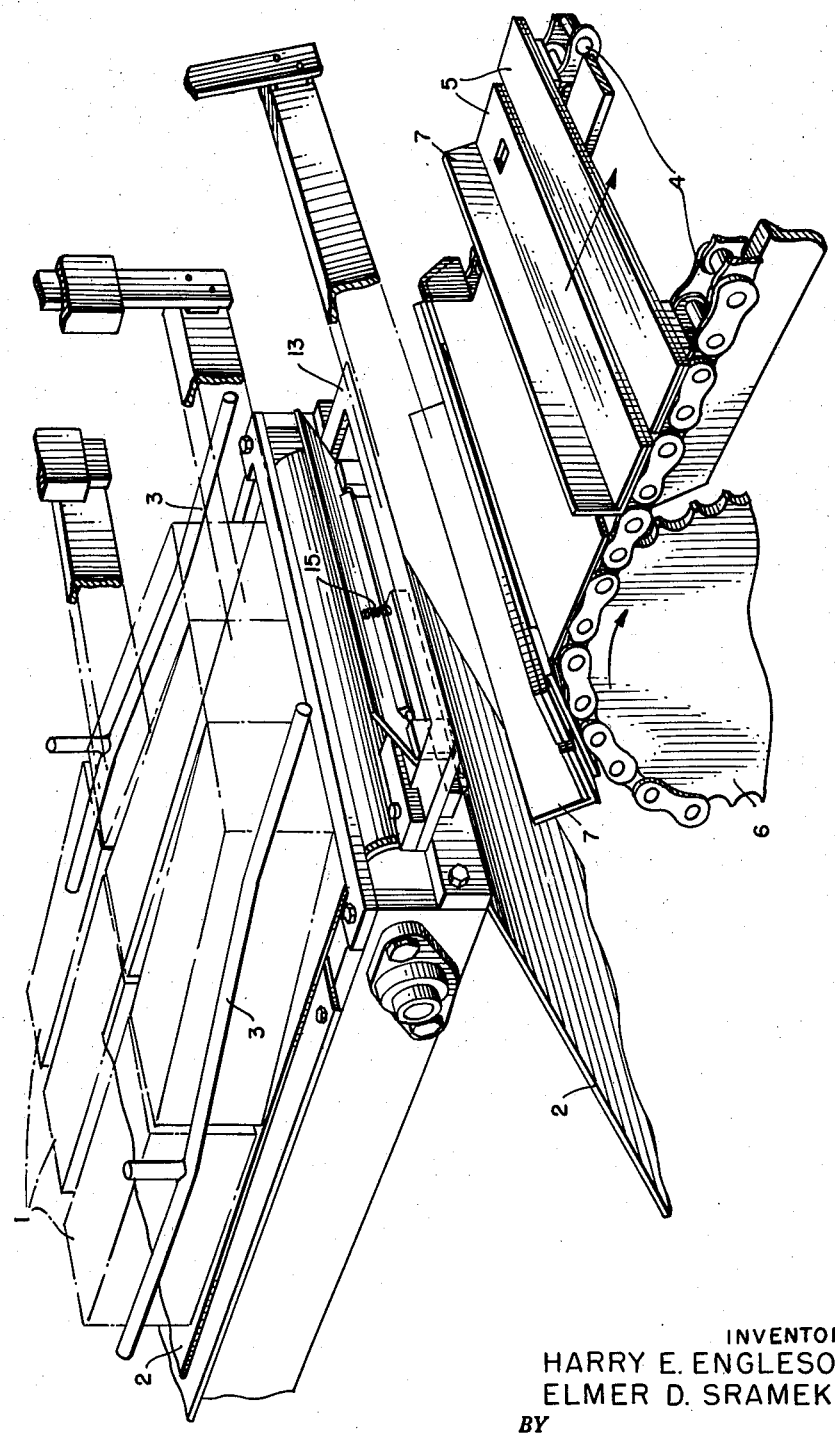
Fig. 2 is an enlarged detail portion of a part of the apparatus shown generally in Fig. 1 but with certain parts broken away to illustrate further underlying structure.

The articles 1, as shown in the drawings, may be of generally rectilinear shape and may move along a conveyer belt 2, either singly or in groups of articles in side-by-side relation, as shown in Fig. 2. In a preferred embodiment of this invention, the articles 1 are packages of cookies or crackers which may be wrapped in cellophane or waxed paper and are generally rectilinear in shape. A pair of stationary side guides or rails 3, Fig. 2, may contain the articles 1 on the belt 2 and may converge somewhat to bunch the articles into close lateral configuration. A second conveyer 4 having buckets or especially adapted pockets 5 thereon is supported at one end by a sprocket 6. The buckets, as shown, may be sectionalized for facilitating their movement about the sprocket 6; thus, a leading portion of the bucket may be a relatively flat plate extending between the conveyer chains 4, Fig. 2, while a trailing portion may be a plate of similar dimension but with an upwardly turned trailing flange 7. The initial end of the bucket conveyer is positioned near a pulley 8 which forms the terminal end of the belt conveyer 2, and the articles 1 transported by the bucket conveyer 4 continue to move generally along the same line as those articles carried on the belt conveyer 2. To permit the articles to pass easily from the belt conveyer 2 to the bucket conveyer 4, the bucket conveyer is positioned at a slightly lower level than the belt conveyer.

A plurality of timing bars 9 are movably positioned over the terminal end of the belt conveyer 2 and the initial end of the bucket conveyer 4. Each timing bar 9 may be an angle member with a part 10 and extending downwardly as the bar moves over the articles 1 on the conveyers and further includes a lateral or horizontal flange 11 extending rearwardly of the direction of motion of said bars and said conveyers. Initially, the timing bar 9 is suspended over the articles 1 on the conveyer 2 and remains at a level above the articles. The articles moving along the belt will pass across a dead plate 12, Figs. 3, 6 and 7, and will continue moving in response to the urging of those articles to the rearward which remain upon the moving belt 2. As an article passes beyond the dead plate 12 into a position A, Fig. 3, the timing bar 9 descends to an intermediate level and depresses the article 1. As shown in Fig. 3, the article 1 in position A, being depressed, is positioned over a shelf structure which includes a stationary peripheral part 13, Fig. 2, and a hingedly mounted part 14 which is urged upwardly from the level of the peripheral part 13 by a compression spring 15. The timing bar 9 depressing the article 1 in position A, Fig. 3, is likewise depressing the hinged shelf 14 which prevents the article 1 from dropping directly off of the dead plate 12.

Figure 6:
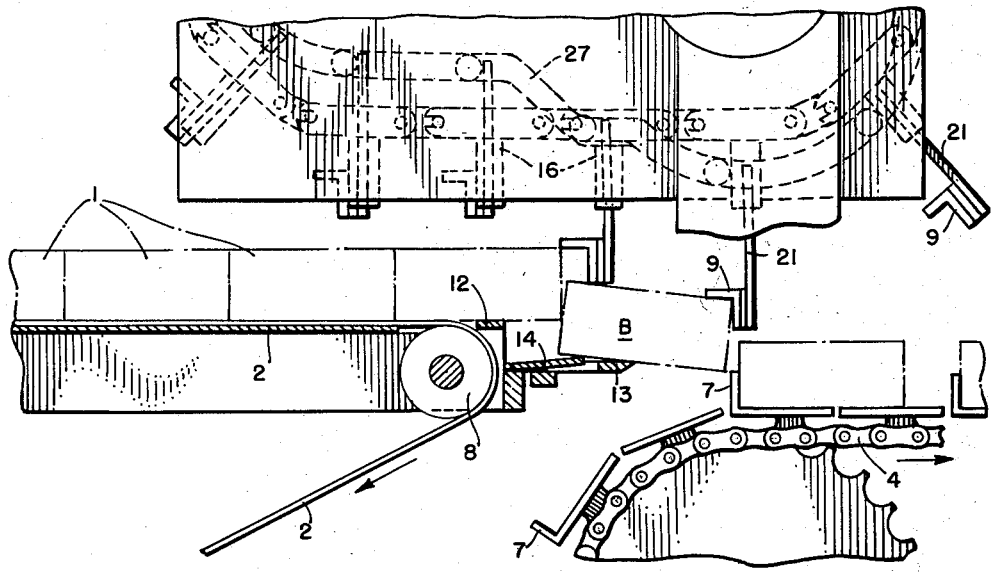
Figs. 6 and 7 are similar vertical sectional views both of which are similar to a portion of Fig. 3.
Figure 7:
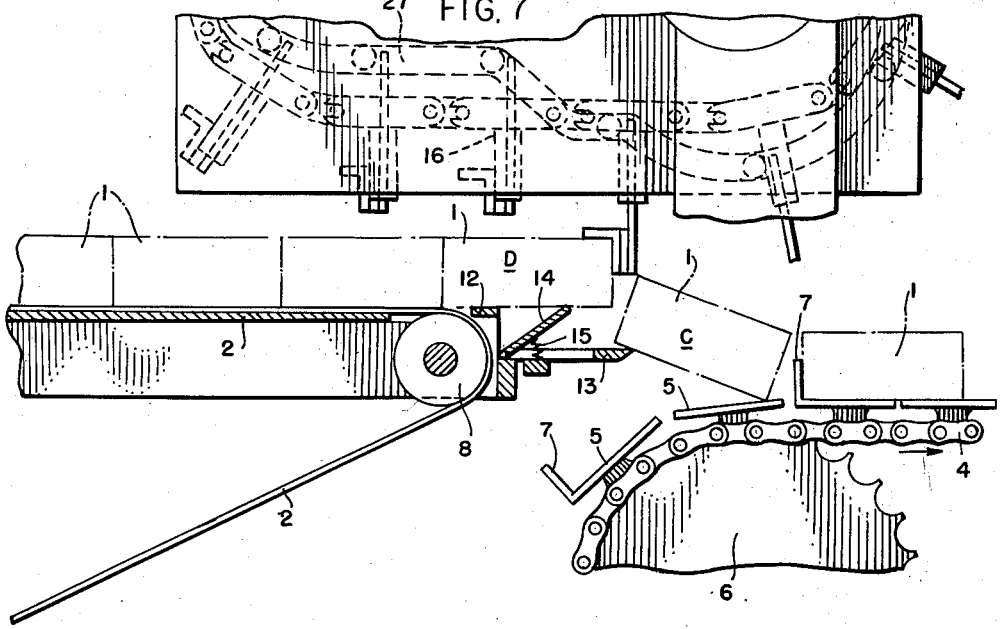

The article 1 is moved across the shelf 13—14 to position B, Fig. 6, by pressure from the rear by the further articles on the belt 2, and continues to move forwardly until the forward end of the article 1 drops into the bucket 5 of the conveyer, as shown in position C, Fig. 7. As the article 1 drops into the bucket 5, it moves forwardly, permitting the next succeeding or second article 1 to move into an abutting relation with the timing bar, as shown in position D, Fig. 7. The article in position C, Fig. 7, continues forwardly and drops completely from the peripheral part 13 of the shelf because of the motion of the conveyer 4 and the continued pressure from the rear as the article in position D, Fig. 7, moves forwardly. As the article drops from the shelf 13, it descends into the bucket 4, as shown in position E, Fig. 3, and thenceforth continues to move with the conveyer 4.

In the operation of this machine, a first timing bar 9 provides an abutting surface to intercept and delay an article 1 while the next succeeding or second timing bar descends and depresses the article which is being delayed by the first timing bar. To function properly, therefore, the spacing between the timing bars 9 must be less than the length of the shortest articles. It may be appreciated that articles need not be perfectly uniform in dimensions. Should certain articles 1 be somewhat longer than others, the forward ends thereof would move into the same abutting relationship with the first timing bar 9 as would the forward ends of the shorter articles. Thus the timing bars 9 will delay and synchronize all of the articles with the movement of the conveyer buckets 5 regardless of the non-uniformities in length.

Figure 1:
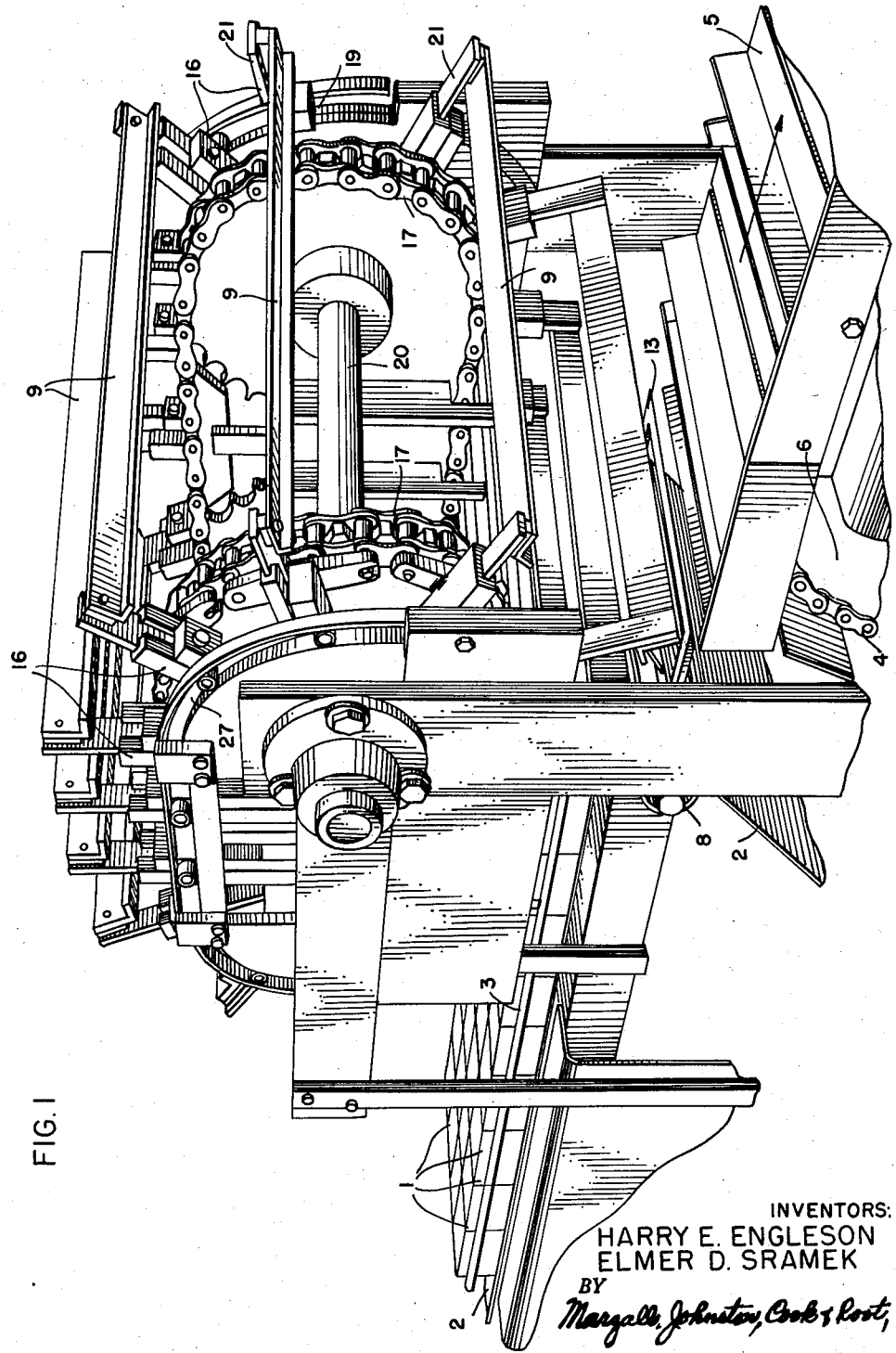
Fig. 1 is a detail perspective view of a portion of the packaging machine employing the teachings of this invention and particularly illustrating the timing bar arrangement for receiving articles from a belt conveyer and passing the articles into the buckets of a bucket conveyer.

The timing bars 9 are slidably mounted in T-shaped brackets 16, each of which is supported on a chain 17 which is entrained about a pair of sprockets 18 and 19. Since the bars 9 are of considerable length, each end thereof is slidably supported in respective brackets 16 and thus two endless chains 17 are provided on two pairs of spaced apart sprockets 18 and 19. The sprockets 19 are fixed to and rotatable with a shaft 20, Fig. 1, which shaft is mechanically coupled by conventional means including gears and further shafts to a drive means providing motivating power for the bucket conveyer 4. Thus, the timing bars 9 may be driven synchronously with the buckets 5 on the conveyer 4.

Each timing bar 9 is rigidly attached at the ends thereof to slide bars 21, each of which is mounted to slide in a guideway 22, Fig. 4 and have a bracket 23 attached thereto. Each guideway 22 is formed integrally with a T-shaped bracket 16 which is adapted to be mounted on a chain 17. Each bracket 23 is attached to a slide bar 21 by means such as a machine screw 24 and each bracket 23 carries a cam roller 25 extending therefrom and mounted to rotate about a pin 26 which may be threadedly attached to the bracket 23. A stationary camway or track 27 is positioned in spaced relation with each of the chains 17 and the sprockets 18 and 19. Each of the timing bars 9 is slidably supported at each end by the slide bars 21 with a cam roller 25 attached thereto, and therefore it is necessary that the packaging machine have two stationary camways or tracks 27, one of which is associated with each of the chains 17 and the pairs of sprockets 18 and 19.

The stationary camway 27 curves radially inwardly as the timing bars move downwardly and forwardly around the sprockets 18, and therefore the timing bars are initially held in spaced relation over the terminal end of the belt conveyer 2. As each timing bar moves forwardly to a point substantially at the end of the dead plate 12, the camway 27 extends diagonally downward to an intermediate level whereupon each of the timing bars likewise descends to an intermediate level to impinge upon and depress an article 1 against the urgings of the pivotal part 14 and spring 15 to the level of the shelf 13. When the timing bar reaches a position substanitally at the forward end of the shelf 13, the track or camway 27 extends downwardly to a third or lowermost level. Thus, the timing bar likewise moves downwardly depressing the forward end of an article 1 into a conveyer bucket. Subsequently, the timing bars move upwardly around the sprockets 19, across an upper reach of the chain 17 and thence downwardly around the sprocket 18 to return the initial operative position. Since in this part of the cycle, the timing bars perform no useful function other than to return for the commencement of a new operation, the configuration of the track or camway 27, moving upwardly around the sprocket 19 across the top reach of the chain 17 and downwardly around the sprocket 18, is of little consequence and therefore the tracks 27 may be substantially circular at the ends around the sprockets 18 and 19 and substantially linear across the top reach of the chain 17. If, on the other hand, the track or camway 27 is brought radially inwardly at the ends around the sprockets 18 and 19 and across the top reach of the chain 17, the timing bars will be contracted inwardly and the timing assembly unit of the machine may be somewhat more compact, thus effecting a saving of space.

Since the timing bars extending radially outwardly from the sprockets 18 and 19 may be of considerable weight, it is necessary that the brackets 16, offering slidable support thereto, be mounted in a stable manner on the chain 17, and therefore it is desirable that pivotal mounting pins 28 and 29, holding and supporting the forward and rearward ends of the bracket respectively, be spaced apart as great a distance as practicable. The forward mounting pins 28 may extend from the chains 17 and be pivotally secured to the T-brackets 16. The rearward mounting pins 29 extend from the chains 17 into a slot 30 such that the T-bracket may pivot thereabout and within limits may be slidably positioned thereon. This type of mounting is important since the T-bracket 16 must be firmly secured to the chain, both when the chain moves linearly between the sprockets and when the chain moves circularly about each sprocket. It will be appreciated that when a T-bracket is moving circularly about either of the sprockets 18 and 19, it will describe a chord of a circle, which chord is somewhat shorter in length than the circular length which must be defined by the chain. On the other hand, when the chain moves linearly between the sprockets, the distance between mounting pins 28 and 29, with respect to the length of the T-bracket, is the same as the linear distance defined by the chain. Thus, the pin 29, extending into the slot 30, provides a stable mounting for one end of the T-bracket 16, while permitting certain fluctuation or variation in the linear length between the pins 28 and 29 as the chain moves both linearly and circularly.

The particular machine illustrated in the drawings and heretofore described passes three articles 1 side-by-side from the belt conveyer 2 and thus groups the articles three in a bucket 5 on the bucket conveyer 4. It will be appreciated, however, that other machines employing the teachings of this invention could pass articles singly into each bucket or could group the articles side-by-side in any desired groupings.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. In a packaging machine, apparatus for receiving articles from a belt conveyer and for inserting the articles into buckets on a bucket conveyer, said apparatus comprising a plurality of timing members moving longitudinally of and in spaced relation with the belt conveyer, supporting means for the timing members operable to move each timing member downwardly from an initial level above the articles on the belt conveyer to an intermediate level of impingement against a first article and thence downwardly to a lowermost level whereupon the first article is depressed into the bucket and whereupon a next succeeding article will abut against the timing member, means for moving each timing member synchronously with a bucket on the bucket conveyer, each timing member being operable to restrain the movement of an article from the belt conveyer and to depress the article into the bucket.

2. In a packaging machine having a belt conveyer for carrying articles and having a bucket conveyer for receiving the articles from the belt conveyer, apparatus for passing a predetermined number of articles into each of the buckets thereon, said apparatus comprising a plurality of spaced apart timing bars, means for moving said timing bars in spaced relation over a terminal end of the belt conveyer and over an initial end of the bucket conveyer, means operatively associated with the timing bars for moving the timing bars longitudinally of both conveyers and in synchronism with the movement of the bucket conveyer, and support means coupled to move each timing bar vertically from an initial level above the articles on the belt conveyer downwardly to an intermediate level with the timing bar impinged against the article from above and thence to a lowermost level with the timing bar depressing the article into a bucket of the bucket conveyer.

3. In a packaging machine having a belt conveyer for carrying articles and having a bucket conveyer for receiving the articles from the belt conveyer, apparatus for passing a predetermined number of articles from the belt conveyer into each bucket of the bucket conveyer, said apparatus comprising a plurality of spaced apart timing bars movably mounted over a terminal end of the belt conveyer and an initial end of the bucket conveyer, means drivingly associated with the timing bars for moving the timing bars longitudinally of the conveyers and synchronously with the belt conveyer, cam means operatively associated with the timing bars for moving each timing bar downwardly from an initial level over the articles on the belt conveyer to an intermediate level whereupon the timing bar impinges against and depresses a first article thereunder and for thence moving the timing bar downwardly to a lowermost level whereupon the timing bar depresses the first article into a bucket of the bucket conveyer and whereupon the timing bar provides a surface against which the next succeeding article will abut, and a yieldable supporting means positioned at the terminal end of the belt conveyer for supporting each article as the article is being depressed by a timing bar.

4. In a packaging machine having a belt conveyer for carrying articles and having a bucket conveyer for receiving articles from the belt conveyer, apparatus for passing a predetermined number of articles from the belt conveyer into each bucket of the bucket conveyer, said apparatus comprising a pair of sprockets with a chain trained therearound, a plurality of supporting brackets attached to the chain, a timing bar slidably mounted in each of the supporting brackets, a cam means operatively associated with the timing bars for moving each timing bar within the slide mounting of the respective bracket, the timing bars being positioned to move with the chain longitudinally over a terminal part of the belt conveyer and an initial part of the bucket conveyer, the cam means being operable to move each timing bar downwardly from a first level to an intermediate level impinging upon an article thereunder and thence to move the timing bar downwardly to a lowermost level thereby depressing the article into a bucket of the bucket conveyer.

5. In a packaging machine having a belt conveyer for carrying articles and having a bucket conveyer for receiving the articles from the belt conveyer, apparatus for passing a predetermined number of articles from the belt conveyer into each bucket of the bucket conveyer, said apparatus comprising a pair of sprockets with a chain trained therearound, a plurality of brackets attached to the chain and spaced apart thereon, each bracket having a slideway extending radially from the chain, a timing bar operatively associated with each bracket and slidable therein, a cam means operatively associated with each timing bar to determine the slide position within the bracket, said cam means being operable to move each bracket from a first level positioned over a terminal end of the belt conveyer downwardly to a second level whereupon the timing bar impinges upon and depresses a predetermined number of articles, said cam means being further operable to move the timing bar downwardly to a third level whereupon each end of the predetermined number of articles is depressed into a bucket of the bucket conveyer and whereupon an abutting surface is provided to engage and restrain a second group of the predetermined number of articles, and a yieldable support member positioned at the end of the belt conveyer for supporting the articles as the timing bar depresses said articles thereagainst.

6. In a packaging machine having a belt conveyer for carrying articles and having a bucket conveyer for receiving the articles from the belt conveyer, apparatus for passing a predetermined number of articles from the belt conveyer into each successive bucket of the bucket conveyer, said apparatus comprising two rotatably mounted spaced apart shafts, a pair of sprockets mounted to rotate on each of the shafts, a pair of chains trained about the sprockets, a plurality of spaced apart brackets on each of the chains, a plurality of timing bars, each timing bar being slidably mounted at each end thereof in respective brackets of each of the chains, a pair of stationary camways positioned in spaced relation with each of the chains, means associated with each of the timing bars at each end thereof and with the camways for moving the timing bars vertically as the chain carries the brackets therealong, the timing bars being positioned to move longitudinally of the conveyers over a terminal part of the belt conveyer and over an initial part of the bucket conveyer, said camways and said cam engaging means cooperating to move the timing bars in sequence from a first level to an intermediate level and thence to a lowermost level, each of the said timing bars being positioned above the articles on the belt conveyer when at the first level, said timing bars impinging upon and depressing the articles from the terminal end of the belt conveyer when said timing bars move to the intermediate level, and said timing bar depressing a forward end of the article as the timing bar moves to the lower level whereupon the article will be received in a bucket of the bucket conveyer, and a yieldable support means for supporting the articles from the bottom thereof as the timing bars impinge against the top thereof.

7. The apparatus according to claim 6 wherein the yieldable support means includes a peripheral shelf part positioned in fixed relation to the terminal end of the belt conveyer and above the buckets moving upwardly around the initial end of the bucket conveyer, a pivotally supported shelf part positioned within the periphery of the fixed shelf part, and spring means for yieldably urging the pivotal shelf part upwardly against an article which may be depressed by a timing bar.

8. A structure for supporting radial timing bars comprising a pair of sprockets with a chain trained therearound, the first mounting pin attached to and extending from a link of the chain, a second mounting pin attached to and extending from another link of the chain, said second mounting pin being spaced from the first mounting pin by a predetermined number of links along the chain, a T-shaped bracket extending between and supported by the pins, said bracket being pivotally attached to the first pin and being slidably attached to the second pin whereby the spacing between the pins may be variable to permit the chain to assume a circular configuration about each of the sprockets and to further permit the chain to assume a linear configuration between the sprockets, said bracket having a radial slideway extending outwardly from the chain, a slide bar attached to each timing bar and slidably positioned within the slideway of a bracket whereby the timing bar will move longitudinally with the chain and may slide to predetermined positions radially from the chain.

9. The structure according to claim 8 wherein is included a stationary camway positioned in spaced relation to said sprockets and chain, and a cam roller attached to the slide bar and positioned within the camway whereby the camway and cam roller cooperate to determine the radial positioning of the timing bar.

References Cited in the file of this patent

UNITED STATES PATENTS

| | | |
|---|---|---|
| 2,415,592 | Hoemecke | Feb. 11, 1947 |
| 2,704,592 | Hoppe | Mar. 22, 1955 |
| 2,746,224 | Wollett | May 22, 1956 |
| 2,815,848 | Jones | Dec. 10, 1957 |